US010902957B2

(12) United States Patent
Blanc et al.

(10) Patent No.: US 10,902,957 B2
(45) Date of Patent: Jan. 26, 2021

(54) NUCLEAR REACTOR ASSEMBLY HAVING A REVERSIBLE WELDLESS CONNECTION BETWEEN A CASING AND AN ELEMENT INSERTED THEREIN

(71) Applicant: COMMISSARIAT A L'ENERGIE ATOMIQUE ET AUX ENERGIES ALTERNATIVES, Paris (FR)

(72) Inventors: Victor Blanc, Marseilles (FR); Thierry Beck, Pierrevert (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 236 days.

(21) Appl. No.: 16/029,107

(22) Filed: Jul. 6, 2018

(65) Prior Publication Data

US 2019/0013106 A1  Jan. 10, 2019

(30) Foreign Application Priority Data

Jul. 6, 2017 (FR) ..................... 17 56388

(51) Int. Cl.
*G21C 3/334* (2006.01)
*G21C 19/34* (2006.01)
(Continued)

(52) U.S. Cl.
CPC ............. *G21C 3/334* (2013.01); *G21C 3/324* (2013.01); *G21C 19/19* (2013.01); *G21C 19/34* (2013.01);
(Continued)

(58) Field of Classification Search
CPC .......... G21C 1/03; G21C 1/022; G21C 19/19; G21C 19/34; G21C 3/324; G21C 3/334; G21C 5/10
(Continued)

(56) References Cited

U.S. PATENT DOCUMENTS 4,348,353 A   9/1982  Christiansen et al.
4,568,111 A   2/1986  Christiansen et al.
(Continued)

FOREIGN PATENT DOCUMENTS

FR   2.197.208      3/1974
FR   2 551 248 A1   3/1985

OTHER PUBLICATIONS

French Preliminary Search Report dated Mar. 1, 2018 in French Application 17 56388 filed on Jul. 6, 2017 (with English Translation of Categories of Cited Documents).

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

An assembly to be inserted into a nuclear reactor, such as a liquid sodium-cooled fast neutron reactor, includes an assembly hollow body of elongate shape along a longitudinal axis X. The wall of the hollow body includes at least one through-opening. The assembly also includes an assembly element inserted into the hollow body. The assembly element includes at least one flexible blade of which the free end is shaped into a clip-fastening hook collaborating in clip-fastening fashion with the through-opening from inside the hollow body, so as to connect the assembly element to the hollow body. The assembly also includes at least one removable structure for locking the flexible blade clip-fastened into the through-opening. The removable locking structure makes it possible to prevent the flexible blade from flexing and thus the removable locking structure makes it possible to lock a connection between the assembly element and the hollow body.

15 Claims, 4 Drawing Sheets

(51) Int. Cl.
    *G21C 19/19*    (2006.01)
    *G21C 3/324*    (2006.01)
    G21C 1/03       (2006.01)
    G21C 1/02       (2006.01)
    G21C 5/10       (2006.01)

(52) U.S. Cl.
    CPC .............. *G21C 1/022* (2013.01); *G21C 1/03* (2013.01); *G21C 5/10* (2013.01)

(58) Field of Classification Search
    USPC ........................................ 376/264, 364, 446
    See application file for complete search history.

(56) References Cited

U.S. PATENT DOCUMENTS

| | | | | |
|---|---|---|---|---|
| 4,675,151 A * | 6/1987 | Leclerco | ................. | G21C 5/06 |
| | | | | 376/364 |
| 4,738,821 A * | 4/1988 | Shallenberger | ........ | G21C 3/334 |
| | | | | 376/446 |
| 5,390,222 A * | 2/1995 | Rau | ......................... | G21C 3/32 |
| | | | | 376/364 |
| 2004/0109524 A1* | 6/2004 | Reparaz | ................. | G21C 3/334 |
| | | | | 376/434 |

* cited by examiner

NUCLEAR REACTOR ASSEMBLY HAVING A REVERSIBLE WELDLESS CONNECTION BETWEEN A CASING AND AN ELEMENT INSERTED THEREIN

TECHNICAL FIELD

The present invention relates to an assembly intended to be inserted into a liquid-metal-cooled, notably liquid-sodium-cooled fast neutron nuclear reactor known as a liquid sodium FNR or SFR (sodium fast reactor) and which forms part of the family of what are known as fourth generation reactors.

The invention seeks first of all to offer a fuel assembly which can be used in the short term in the fourth-generation reactor French technology demonstrator project dubbed ASTRID.

The invention seeks more particularly to offer a weldless connection between the assembly hollow body made up of a hexagonal-section tube and the body of the upper neutron shield (UNS) of a fuel assembly for a SFR, which connection can be made with the bundle of fuel pins present in the assembly.

The fuel assemblies at which the invention is aimed may be used just as well in a nuclear reactor of the integral type, which means to say in which the primary sodium coolant circuit and pumping means is fully contained within a vessel that also contains the heat exchangers, as it can in a reactor of the circuit type, which means to say in which the intermediate heat exchangers and the primary sodium coolant pumping means are situated outside the vessel.

What is meant by an assembly is an assembled unit that is loaded into and/or unloaded from a nuclear reactor.

What is meant by a fuel assembly is an assembly comprising fuel elements and that is loaded into and/or unloaded from a nuclear reactor.

What is meant by a fuel assembly of the liquid sodium FNR or SFR type, is a fuel assembly designed to be irradiated in a liquid sodium cooled fast neutron nuclear reactor referred to as a liquid sodium FNR or an SFR.

Although described with reference to the key intended application, namely a fuel assembly for a nuclear reactor, the invention may be applied to any type of assembly for a nuclear reactor, such as a reflector, a lateral neutron shield (LNS), a control rod, an experimental assembly, an additional safety device, etc.

PRIOR ART

Fuel assemblies intended to be used in sodium fast reactors (SFRs) have a specific mechanical structure in order notably to allow the liquid sodium to pass within them.

Figures 1, 2, 3, 3A, 3B:
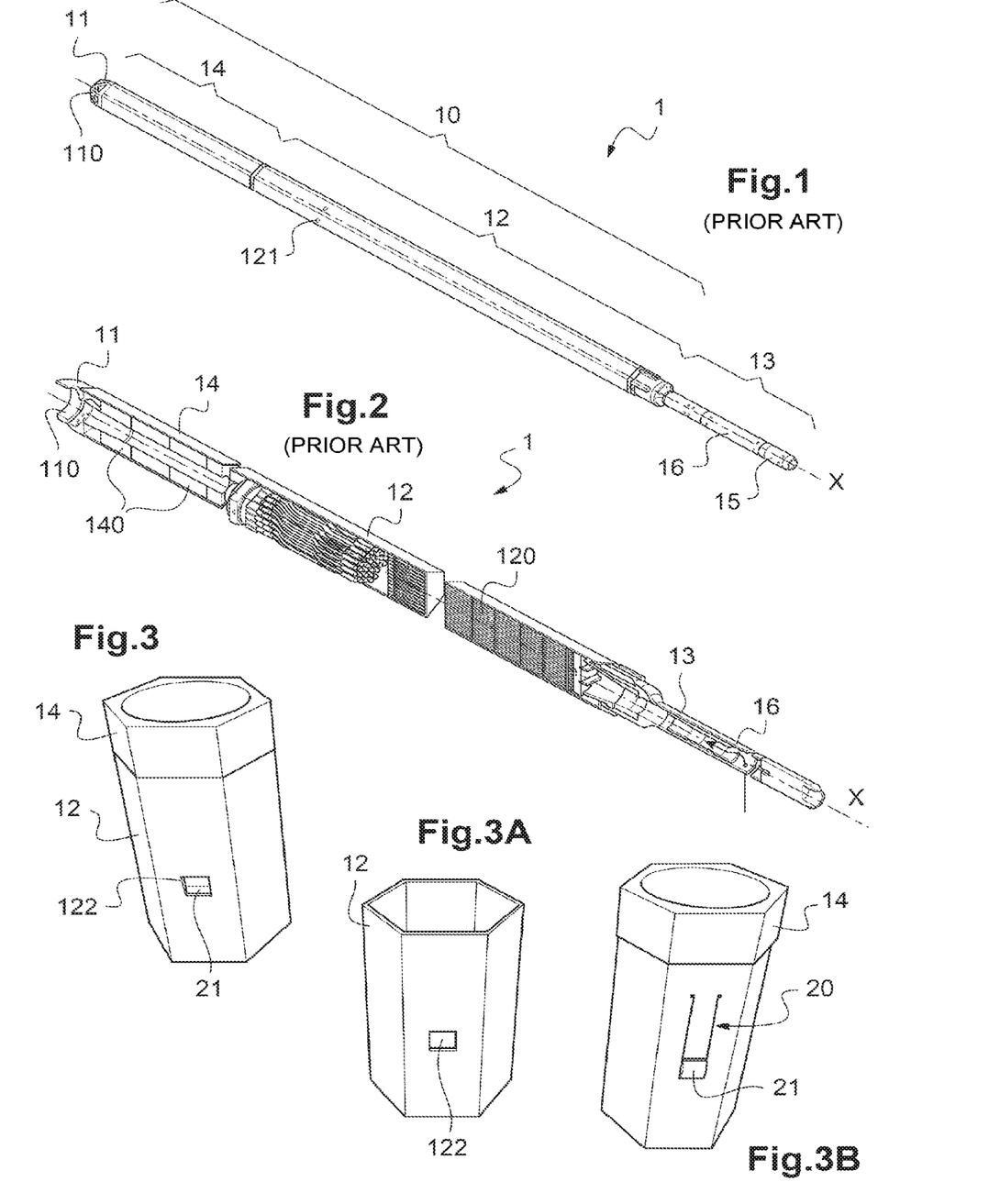
FIG. 1 is an external perspective view of a fuel assembly according to the prior art, already used in an SNF sodium-cooled nuclear reactor.
FIG. 2 is a view in cross section of the assembly depicted in FIG. 1.
FIGS. 3, 3A and 3B are external perspective views of, respectively, part of a fuel assembly with the connection according to the invention made between the central portion constituting the assembly body and the UNS body; the assembly body and the UNS body before they are connected.

A fuel assembly 1 already used in the SFR known by the name of "Phénix" has been depicted in FIG. 1.

Such an assembly 1 of elongate shape along a longitudinal axis X comprises first of all a tube or casing 10 of hexagonal section, which comprises an upper portion 11 forming the gripping head of the assembly, an upper neutron shield (UNS) device with a body 14, and a central portion 12 constituting the hollow body of the assembly which encloses fuel pins 120. The head 11 of the assembly comprises a central opening 110 opening within it and is generally connected to the UNS or to the central portion 12 by welding.

The upper neutron shield device contains blocks 140 of neutron absorbing material such as boron carbide $B_4C$ and/or steel. Its role is to lessen the neutron flux and protect the internals and the head of the primary vessel. The body of the UNS 14 is generally connected to the central portion 12 by welding.

The assembly 1 also comprises a lower portion 13 forming the foot of the assembly, in the extension of the hexagonal casing 10. The foot 13 of the assembly has a distal end 15 shaped as a cone or rounded so that it can be inserted vertically into the guide sockets of the diagrid (support) of a reactor core. The foot 13 of the assembly comprises at its periphery openings 16 opening into it.

Thus, when a fuel assembly is in the installed configuration, which means to say when it is in the position it occupies when loaded into a reactor core, the foot 13 of an assembly 1, which is of a male shape, is inserted into an opening in the diagrid of the reactor thus holding the assembly 1 therein with its longitudinal axis X vertical.

The primary coolant sodium may circulate inside the casing 10 of the assembly 1 and thus by thermal conduction carry the heat released by the fuel pins. The sodium is thus introduced via the openings 16 in the foot 13 and emerges via the central opening 110 in the head 11, after having passed along the bundle of fuel pins.

The central portion 12 of an assembly comprises a plurality of nuclear fuel pins 120. Each pin takes the form of a sealed cylindrical tube of cladding in which there is stacked a column of fissile (or fertile) fuel pellets within which the nuclear reactions that release heat take place. All of the columns define what is usually referred to as the fissile (or fertile) zone, which is situated approximately midway up the height of an assembly 1.

All the assemblies of the one same reactor are arranged vertically on a diagrid to from a core with a compact hexagonal-cells grid.

The assemblies in positon on the diagrid are spaced apart from one another at their base (foot), typically by a few mm between facing faces of two adjacent hexagonal section casings.

It is necessary for this spacing to be kept substantially constant over the entire height of the assembly while the reactor is in operation.

This is because any narrowing of the gap between two adjacent fuel assemblies immediately leads to an increase in reactivity, i.e. a rapid increase in power, which could have serious consequences, such as overheating, blockage, etc. and lead to a core melt accident.

In order to guard against that, it is known practice in existing SFRs to add spacer devices 121 in the upper part of the casing of the assemblies, just above the fissile pins.

In general, these devices are positioned at a height equivalent to approximately ⅔ of the height of the assembly projecting above the diagrid.

These spacer devices, usually referred to as "straps" essentially consist of bosses, namely additional thicknesses, projecting to the outside of the assembly body. Each face of the hexagonal cross section of the casing is provided with a boss (strap).

Such spacer straps are found in emergency shutdown rods, more specifically, on the exterior periphery of a ring referred to as a pad ring, substantially at the same longitudinal level as the interior additional thicknesses usually referred to as "pads".

In a fuel assembly, the connection created between the central portion 12 and the UNS body 14, or between the UNS body 14 and the gripper head 11, needs to meet a certain number of requirements. In particular, in an assembly dedicated to a liquid sodium-cooled nuclear assembly, the connection needs to meet the following major requirements:

i/ it needs to be compatible with the manufacture and assembly of the assembly, ii/ it needs to withstand the forces during the operation and handling phases, and iii/ it needs not to generate migrating bodies in the primary coolant sodium circuit.

In the context of fuel assemblies for SFRs known respectively by the names of "Phénix" and "Superphénix", this connection was made by welding. Manufacturing feedback on this connection without welding was not completely satisfactory. Not only did the welds prove difficult to achieve, but they were tested using test specimens, leading to a delay between making the test specimen and the time at which the results were available. Furthermore, the bundle of fuel pins is put in place in the hexagonal tube before the welded connection is made between this tube and the mass of components all around, thus requiring welding with protection, and lengthy and costly handlings of assemblies during the welding, inspection or repair operations. Finally, a defective weld made with the bundle of fuel pins in place would lead to complete loss of the assembly.

At the present time, in the case of the fuel assemblies envisioned for the ASTRID reactor, the isotopes present in the new fuel generate far more radioactivity and heat than was the case with the Phénix and Superphénix assemblies. Providing operators with radio protection therefore becomes a key issue. Indeed it is out of the question for an operator to weld and inspect welds while the fuel pins are in the assembly, which they are if the hexagonal tube 12 and the UNS body 14 are to be welded together.

On the other hand, the welding together of the central portion 12 and the foot of the assembly 13 is performed before the pins are mounted in the assembly.

It is thus recommended that any welding be done before the bundle of pins is put in place and that after this placement has been performed only weldless operations which are easier to perform and to inspect be carried out.

This recommendation is all the more necessary since, in the context of ASTRID, the use of a central portion made of ferritic steel, of EM10 type, would also entail a high-temperature post-weld stabilization heat treatment operation because the UNS is made from a steel of another type, in this instance austenitic steel.

The studies carried out for refueling with Superphénix assemblies proposed, as a solution to this problem, a pressed connection between the UNS 14 and the central portion 12, as detailed in patent FR 2544122. In this type of connection, the hexagonal casing of the central portion is deformed by a spherical punch in the middle of each of its faces and thus pressed into recesses machined in the faces of the UNS.

That solution is relatively well suited to the geometry of the Superphénix assemblies given the space available axially (degree to which the UNS and the hexagonal casing are pushed one inside the other) and the great thickness of the steel UNS which make it possible to guarantee good pressing geometry without the risk of deforming the UNS. However, this pressed connection requires there to be in the UNS recesses that are deep enough to provide the pressed connection with sufficient pull-out strength and requires the UNS to be thick enough that any deformation thereof during the pressing phase is excluded.

Now, the inventors have analyzed that the thickness of the body of the UNS of the assemblies dedicated to the ASTRID reactor, as planned, is too small for this type of connection to be made reliably. Thus, a pressing operation presents a serious risk of deforming the UNS. Even though pressing might be feasible by adding a retractable counter-punch, the mechanic integrity of the connection would need to be checked via tensile (pull-out) testing simulating handling loads. Given the thickness of the heavy gauge plate that is smaller in comparison with the Superphénix assemblies, and the recess depth that is smaller because of the smaller thickness of UNS, the inventors believe that the mechanical strength of the connection can be expected to be lower.

As a result, the inventors believe that it is not technically conceivable to produce a stamped connection between the UNS and the body of the assembly (hexagonal tube) in the case of a fuel assembly dedicated to ASTRID, because the aforementioned major requirements i/ and ii/ would not be met.

Another alternative solution to welding envisioned in the context of the Superphénix design studies was to create a pegged connection. This type of connection is achieved by pushing the body of the UNS into the central portion forming the hollow body of the fuel assembly and joining these two elements together by forcibly inserting pegs into orifices in the UNS. Several pegs per face would be needed in order to obtain satisfactory mechanical strength.

Nevertheless, the fitting of the pegs carries the risk of deforming the component on the inside when this component is of small thickness, as is the case for the assembly head and the pad ring of the fuel assemblies and shutdown rods dedicated to ASTRID. The close fit of the pegs also requires a great deal of precision vis-à-vis positioning tolerances, which will undoubtedly be incompatible with the clearance required between the components for the purposes of assembly. Therefore compliance with the aforementioned requirement i/ may not be guaranteed.

Furthermore, a pegged assembly carries a significant risk of one of the pegs becoming lost or detached, leading to bodies migrating in the primary coolant sodium and therefore possibly having severe consequences regarding the safety and operability of the reactor. In other terms, the aforementioned requirement iii/ may not be met.

Patent JPH07260973A refers to an alternative solution to welding for the connection between the central portion and the assembly head which have hexagonal cross sections, in a fuel assembly for a fast neutron reactor. The solution divulged consists in using an attached clamp for the connection between the assembly head and the central portion. These are aligned and brought into abutment via their ends along a planar contact plane. On each face of the head and of the central portion, a cavity with a restriction in cross section is machined into the thickness of the component. A clamp is attached so that it fits into the cavity in the head and in the central portion and is fixed by screwing, thus joining the two elements together.

The inventors believe that this clamped connection solution is not conceivable in the context of assemblies for the ASTRID reactor. Specifically, first of all, the butt-joined connection with no interpenetration cannot meet the mechanical strength requirements ii/, notably when the connection is stressed in bending under the lateral loadings of the reactor in operation. In addition, this clamped connection requires an assembly head that is thick enough that a cavity can be machined therein. The inventors estimate that a thickness of the order of 10 mm would be necessary, whereas the thickness available for an assembly head of a fuel assembly dedicated to ASTRID is only of the order of 5 mm. Finally, the screw fixings of the clamp carry the risks that, under mechanical stress loading, they could become unscrewed leading, in addition to the loss of connection and therefore to the impossibility of withdrawing the assembly, to the generation of bodies migrating in the sodium and therefore potentially to serious consequences such as loss of cooling of an assembly caused by a partial blockage. The screwed connection could be made more secure by adding a locking weld, but the inventors estimate that this measure does not offer a sufficient guarantee of dependability. No more dependable mechanical solution for preventing the loss of a screw or of a clamp is disclosed in that patent. Thus, requirements ii/ and iii/ cannot be met with this type of connection using attached clamps secured by screws.

Patent application CN104575629A discloses a dismantleable connection between two assembly guide tubes of a control mechanism for a pressurized water reactor, without application to a connection between two parts of an assembly body being envisioned. This connection is intended for performing numerous assembly/dismantling operations blind, under the water of the reactor. One of the two tubes comprises two flexible blades of which the thickened end catches in a cavity inside the second tube. The connection is dismantled by applying pressure along the axis of the tube to the end of the flexible blades. Mechanical locking of the blades in their clipped-together position is achieved by means of a ring internal to the tube. This ring also has the function of centering the two tubes relative to each other. The means of dismantling the connection requires simultaneous axial pressure to be applied to the ends of the blades. The connection requires the use of a return spring between the two tubes in order to eliminate the axial clearance in the connection. The fitting of the ring and of the spring may prove not to be easy.

Moreover, in the context of the control rods and, more particularly, of the shutdown rods of the Phénix and Superphénix reactors, the connection between the pad ring and the central portion (assembly body) of the bar is usually performed by welding on two sections of the central portion.

Now, the design of the so-called "low void effect core" of ASTRID would lead to an offsetting of the flux toward the top of the assembly, and therefore to a higher dose at the welds between the pad ring and the central portion, if such a welded connection were maintained. That endangers the integrity of the welds under flux, particularly when it is borne in mind that the target lifespan is longer in comparison with Phénix or Superphénix. Thus, requirement ii/ mentioned hereinabove cannot be guaranteed for a shutdown rod with a welded connection. Furthermore, unlike the Superphénix shutdown rod assemblies where the central portion and the ring are made of steels of the same grade, the central portion of a shutdown rod assembly for ASTRID is envisioned to be in ferritic steel, of type EM10, whereas the corresponding pad ring is envisaged to be in austenitic steel, in a grade 316Ti. The weld joining these two components would therefore require an additional high-temperature stabilization treatment. As a result, the manufacture of a shutdown rod dedicated to ASTRID carries with it an additional risk with the lack of a guarantee of conforming to the aforementioned requirement i/.

Thus, a welded connection between the central portion and the pad ring is not satisfactory for assemblies (shutdown rods) dedicated to ASTRID.

There is therefore still a need to offer an alternative to the existing weldless connections between the UNS and the central portion (assembly body) of a fuel assembly or between a pad ring and the central portion (assembly body) of a control rod, more particularly a shutdown rod, for a fast neutron nuclear reactor of the SFR type, notably in order to meet the aforementioned requirements i/ to iii/ and so that the connection can be made with the bundle of fuel pins present in the fuel assembly, and in instances in which the wall thicknesses of the elements that are to be connected are small.

It is an object of the invention to at least partially meet this need.

SUMMARY OF THE INVENTION

In order to do this, one subject of the invention is an assembly intended to be inserted into a nuclear reactor, notably into a liquid sodium-cooled fast neutron reactor SFR, comprising:
- an assembly hollow body, of elongate shape along a longitudinal axis X, the wall of the hollow body comprising at least one open-ended opening;
- an assembly element inserted at least in part into the hollow body, the assembly element comprising at least one flexible blade of which the free end is shaped into a clip-fastening hook collaborating in clip-fastening with the open-ended opening from inside the hollow body, so as to connect the assembly element to the hollow body;
- at least one removable means for locking the flexible blade clip-fastened into the open-ended opening, the removable locking means making it possible to prevent the flexible blade from flexing and thus lock the connection between the assembly element and the hollow body.

Thus, the invention essentially consists in defining a clip-fastened connection, from the inside of the assembly body, of the thickened free end of flexible blades of the assembly element, with a mechanical locking that is removable from the outside of this assembly body. The advantages of the solution according to the invention are many, and include the following.

For a fuel assembly dedicated to a reactor of SFR type:
- simplicity of producing, qualifying and probably also thermomechanically sizing the connection by comparison with the known solutions of welding, stamping and pegging (pinning) as detailed in the preamble. Requirement i/ ought to be met for a fuel assembly with the connection and locking according to the invention;
- low slippage of the assembly head (housing the UNS) under axial traction by comparison with a stamped solution of the prior art, or in any case slippage limited to the extent of the lateral clearance between the thickened end of a flexible blade and the open-ended opening in the assembly body consisting of the hexagonal-section tube. Requirement ii/ ought to be met for a fuel assembly with the connection and locking according to the invention;
- possible reversibility of the dismantleable connection after the fuel assembly has become irradiated, unlike the known connections of welding and pressing, which might allow the assembly head to be reused multiple times, the side effect of this being an economic saving, and a reduction in the amount of waste;
- absence of the risk of generating bodies migrating in the primary coolant circuit of the reactor, unlike the known pegged solution (which carries the risk of loss of pegs). Requirement iii/ ought to be met for a fuel assembly with the connection and locking according to the invention;
- possibility of applying the connection according to the invention to the solution according to application FR3040234A1 in order to connect the hexagonal strap reinforcing sleeve to the assembly body (hexagonal tube).

For a nuclear shutdown rod dedicated to an SNF type nuclear reactor:

absence of welded connection between the pad ring and the assembly body (hexagonal tube), thus simplifying manufacture and meeting requirement i/;

presence of a single portion of hexagonal tube intact as far as the assembly head, ensuring good mechanical integrity of the assembly body and meeting requirement ii/;

possibility of adapting the connection according to the invention to the solution according to application FR3040234A1 for connecting the hexagonal strap reinforcing sleeve to the assembly body (hexagonal tube), the reinforcing sleeve also comprising pads the location of which may be offset with respect to the straps.

The clip-fastening hook may advantageously be produced by a thickening of the free end of the flexible blade.

According to one advantageous embodiment, the hollow body is of hexagonal cross section and comprising one open-ended opening per face of the hexagon, the assembly element comprising a flexible blade clip-fastened into each of the open-ended openings.

The removable locking means advantageously consists of a locking screw which in the position in which it is screwed into the flexible blade, makes it possible to prevent the blade from flexing and from becoming unclipped.

According to a first alternative form of embodiment, each flexible blade is produced by cutting into the thickness of the assembly element.

According to this first alternative form, the wall of the assembly body comprises at least one open-ended bore designed to allow the locking screw to pass from the outside of the hollow body and the screw head to be housed.

According to a second alternative form, each flexible blade is attached and fixed to the assembly element by a fixing screw.

According to this second alternative form, each fixing screw is welded to the assembly element and/or to the flexible blade in its screwed-in position.

Advantageously, the assembly element comprises at least one cavity in which the clip-fastening hook can become lodged when the blade is in the flexed position, the locking screw being screwed through the hook and housed in the cavity when the blade is clipped in, so as to prevent this blade from flexing.

The assembly which has just been described may constitute a nuclear fuel assembly, the hollow body being the central portion forming a casing cladding fuel pins, the assembly element being an upper neutron shield (UNS) device or the upper portion forming the gripper head of the assembly.

The assembly may thus constitute a non-fuel assembly chosen notably from among a reflector assembly, a lateral neutron shield (LNS) assembly, a shutdown and/or control rod, an experimental assembly, an additional safety device, a mitigation assembly.

When the assembly is a shutdown and/or control rod, the assembly element is the so-called pad ring inserted inside the hollow body forming a casing, the casing comprising on its external periphery at least one spacer plate and at least one pair of open-ended openings on each side of the plate, the pad ring comprising on its internal periphery at least one pad and at least one pair of flexible blades which are arranged in such a way that each clip-fastening hook of the pair of blades collaborates in clip-fastening with one of the open-ended openings.

The invention also relates to a method for assembling an assembly described hereinabove, comprising the following steps:

a/ inserting the assembly element into the assembly hollow body by a translational movement, so as to achieve simultaneous flexing of the flexible blades toward the inside of the hollow body, lowering of the assembly element down inside the hollow body until the flexible blades return to their position toward the outside of the hollow body with their hooks clip-fastened into the corresponding open-ended openings of the hollow body so as to connect the latter to the assembly element;

b/ locking each flexible blade clip-fastened into the open-ended opening using the removable locking means.

The invention also relates to a method for dismantling an assembly described hereinabove, comprising the following steps:

a1/ unlocking each flexible blade the hook of which is clip-fastened into the open-ended opening, by removing the removable locking means;

b1/ applying a radial force to the hook of each flexible blade from the outside of the open-ended opening, so as to cause the flexible blades to flex simultaneously toward the inside of the hollow body, unclipping the hooks, c1/ extracting the assembly element from inside the assembly hollow body via a translational movement.

Steps a1/ to c1/ are preferably performed at a temperature above 100° C., so as to prevent the freezing of the residual liquid metal, sodium in the case of an SFR, present in the clearances of the connection.

The radial force may advantageously be a force perpendicular to the axis of the hooks.

When the assembly element comprises a plurality of flexible blades of which the hooks are individually clip-fastened into an open-ended opening of the hollow body and which are locked, step b1/ is preferably performed by simultaneous actuation of actuators, which are preferably mounted on the one same centering collar, and arranged individually facing one of the open-ended openings.

The connection according to the invention could be applied to any type of nuclear reactor requiring there to be a connection between the body of the assembly of tubular cross section, such as the hexagonal-section tube in the ASTRID reactor, and another element, such as the UNS body in the case of a fuel assembly, or the pad ring in the case of a shutdown rod all dedicated to ASTRID. It may cover all fast neutron reactors (sodium, gas, lead, lead-bismuth, etc.).

The connection according to the invention would be more generally applicable to any connection between a tubular body that makes up an assembly (assembly body, absorber rod body, UNS body, experimental capsule body, differential pressure device, etc.) and another assembly element (foot, head, pad ring, etc.) that needs to be inserted into or connected to the end of this tubular element, irrespective of the shape of these elements (hexagonal, cylindrical, rectangular, etc.).

The present invention is described using as an example a fuel assembly and a shutdown rod, but it is also applicable to all other assemblies (reflectors, LNS, control rods, mitigation assemblies, experimental assemblies, etc.).

DETAILED DESCRIPTION

Further advantages and features of the invention will become better apparent from reading the detailed description of the invention which is given by way of nonlimiting illustration and with reference to the following figures among which.

For the sake of clarity, the same references denoting the same elements of fuel assembly and of strap spacer devices according to the prior art and according to the invention are used throughout FIGS. 1 to 10.

Throughout the present application, the terms "vertical", "lower", "upper", "bottom", "top", "below" and "above" are to be understood with reference to a fuel assembly such that it is in a vertical configuration inside a nuclear reactor.

FIGS. 1 and 2 which relate to the prior art have already been described in detail in the preamble and are therefore not commented upon hereinafter.

Figure 4:
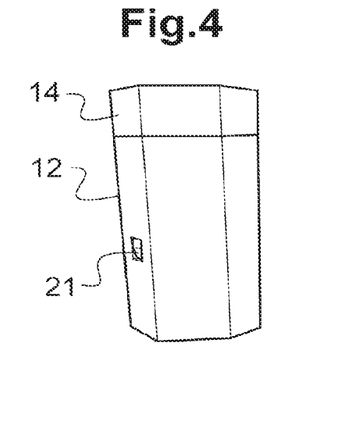
FIGS. 4, 4A and 4B depict the same elements as FIGS. 3 to 3B from a different perspective.
Figure 4A:
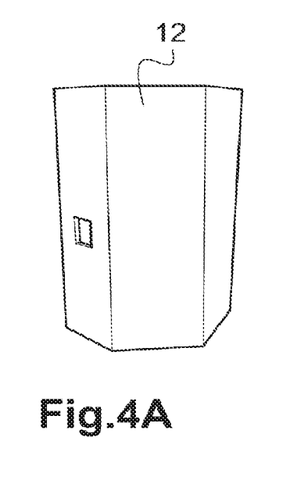
Figure 4B:
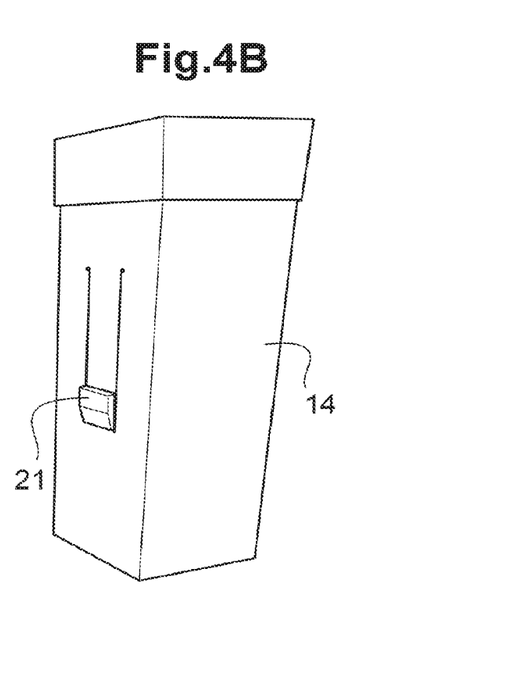

The weldless connection according to the invention between the assembly hollow body 12 (central portion) and an assembly element 14 which is the UNS of a fuel assembly is depicted in FIGS. 3 to 4B from different angles. The central portion 12 and the UNS 14 are depicted in the assembled position and separately.

A thickening 21 is produced at the end of the flexible blade 20 of the UNS and, in the assembled position, namely when the UNS body 14 is inserted into the central portion 12, clips into an open-ended opening 122 of the central portion. For preference, as illustrated, the lower part of the thickening 21 is chamfered to make it easier for the blade 20 to flex as the UNS 1 engages in the end of the hexagonal tube.

As shown in FIGS. 5A to 6B, once the thickening 24 has clip-fastened into the opening 122 of the tube 12, the shoulder 22 produced on the upper part of the UNS 14 comes into abutment with the top of the tube 12, whereas the shoulder 24 produced on the upper part of the thickening 21 is in abutment against the upper edge 124 of the opening 122.

According to this alternative form illustrated, extraction of the UNS from the hollow component 12 is prevented by the discontinuous profile of the thickening 21 defined by the shoulder 24 at the end of the blade, whereas deeper insertion of the UNS into the hollow component 12 is prevented by the profile defined by the shoulder 22 of the UNS 14, of which the exterior cross section above the head designed for insertion into the hollow component is substantially identical to that of the hollow component.

In this way is obtained a weldless connection which allows the manufacture and sizing of a fuel assembly to be simplified considerably as described. Furthermore, the risk of migrating bodies (screws, pegs, etc.) becoming introduced into the primary cooling circuit is avoided.

Figure 5A:
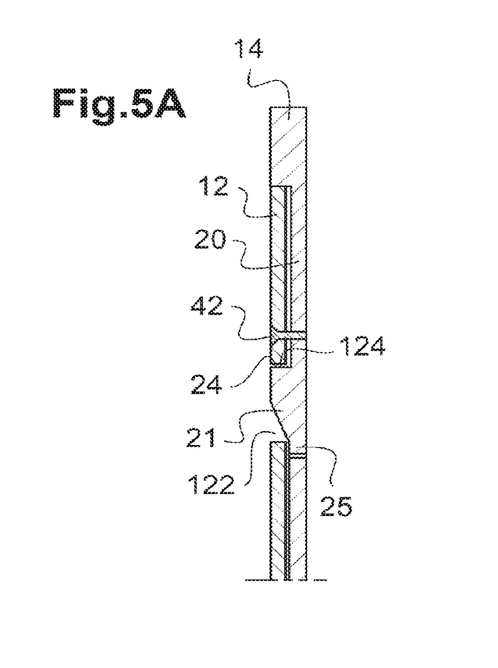
FIGS. 5A and 5B show, schematically in a view in longitudinal section, a first alternative form of embodiment of the flexible-blade connection with locking according to the invention in a fuel assembly, respectively in the locked position and in the process of assembly, in instances in which the flexible blade is produced by cutting into the UNS body.
Figure 5B:
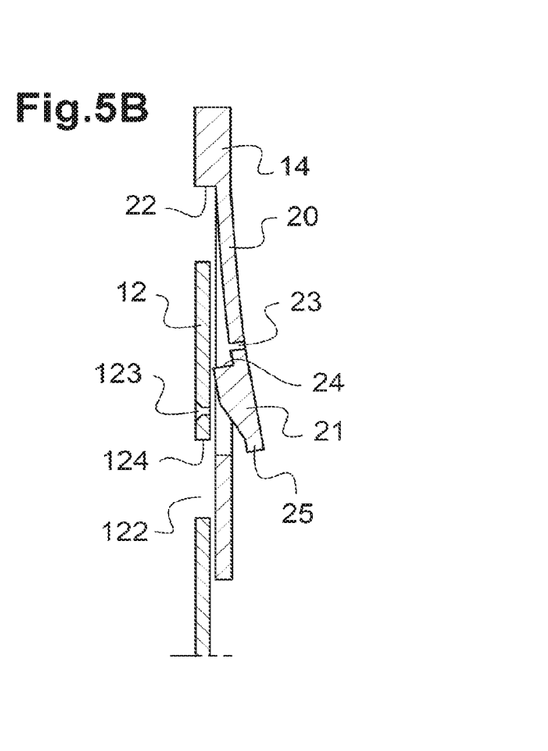

As illustrated in FIGS. 5A and 5B, the flexible blade 20 may be respectively cut into the assembly element 14, if the latter is of small thickness.

Figure 6A:
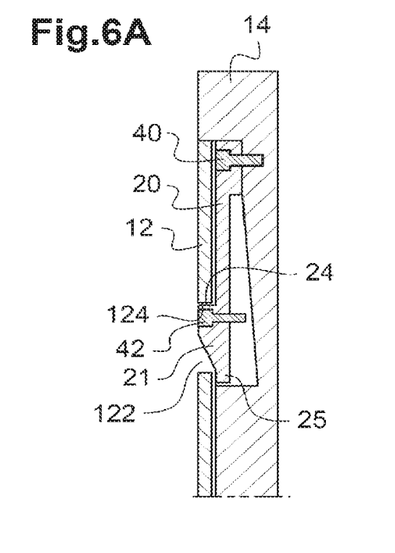
FIGS. 6A and 6B show, schematically in a view in longitudinal section, a second alternative form of embodiment of the flexible-blade connection with locking according to the invention in a fuel assembly, respectively in the locked position and in the process of assembly, in instances in which the flexible blade is mounted on the UNS body.
Figure 6B:
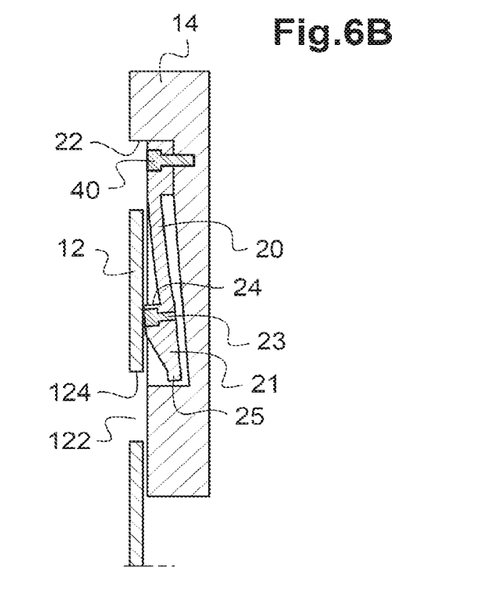
Figures 7, 7A:
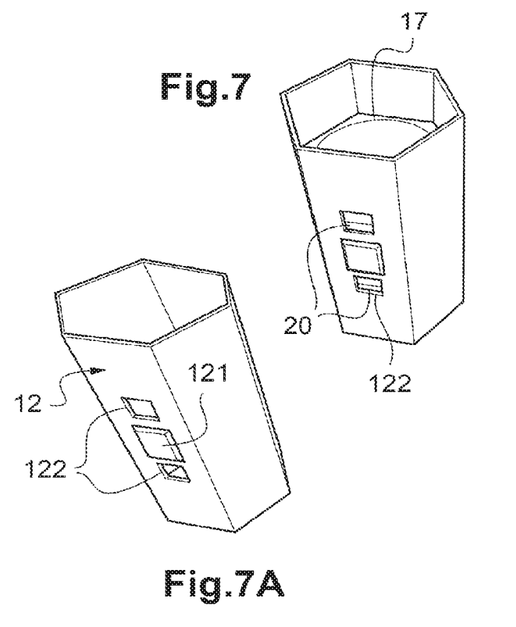
FIGS. 7A, 7, 8 and 8A are views of the central portion in the region of the pad ring with and without the pad ring in the assembled position.
Figure 8:
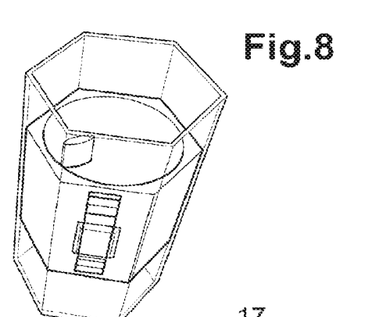
Figure 8A:
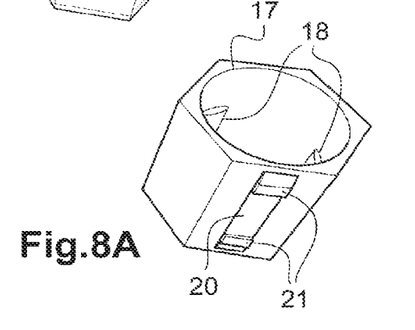

Alternatively, as shown in FIGS. 6A and 6B the blade 20 may be attached to the element 14 using a fixing screw 40, in cases in which the element 14 is of sufficient thickness. Once the connection has been assembled, the fixing screw 40 is itself secured by the presence of the tube 12.

In the assembled position illustrated in FIGS. 5A and 6A, the flexible blade 20 is mechanically locked, by a locking screw 42 which is added after the element 14 has been inserted into the hollow component 12.

In the alternative form of FIG. 5A, the locking screw 42 is screwed through a hole 123 provided for this purpose in the tube 12 into a tapping 23 made in the blade 20, this tapping 23 being opposite the tapping 123 when the blade 20 is in the clip-fastened position.

In the alternative form of FIG. 6A, the locking of the blade by the screw 42 to prevent the blade from flexing is achieved via its end which comes into abutment against the body of the assembly element 14.

If a locking screw 42 is used, a retaining weld needs to be performed in order to prevent it from accidentally loosening and therefore to safeguard its position within the assembly. This screw 42 has no mechanical strength function and therefore the risk of losing this screw is minimal. Furthermore, loss of this screw would not necessarily lead to loss of the connection. Care would be taken to ensure, by design, that the head of the screw 42 is sunk into the thickness of the casing 12 or of the flexible blade 20, so that this head does not extend beyond the volume formed by the casing.

As illustrated in FIGS. 5A and 5B, the flexible blade 20 comprises an overhang 25 measuring a few millimeters around the entire periphery of the thickened portion 21. The role of this overhang 25 is to best cover the open-ended opening 122 of the casing and thus form a kind of labyrinth for the liquid metal, thus making it possible to minimize the leakage of metal through this opening.

FIGS. 7A to 8A illustrate the weldless connection according to the invention in a shutdown rod between a pad ring 17 and a hollow component 12, the pads 18 being situated in the same plane as the spacer straps 121 of the hollow component 12. The two components are depicted separately and in the assembled positon.

In this instance, there are two flexible blades 20 on one same face of the ring 17 facing in two opposite directions so that in the assembled position the thickened portions 21 lock the position of the pad ring both with respect to an upward movement and with respect to a downward movement of the ring within the hollow component.

Another advantage of a connection according to the invention is the possibility of dismantling an assembly according to the invention fairly easily, even if it is irradiated. Thus, an assembly head for example, which has received far less radiation than a central portion, could be reused, leading to savings in terms of economy and in terms of waste management.

Figures 9, 10:
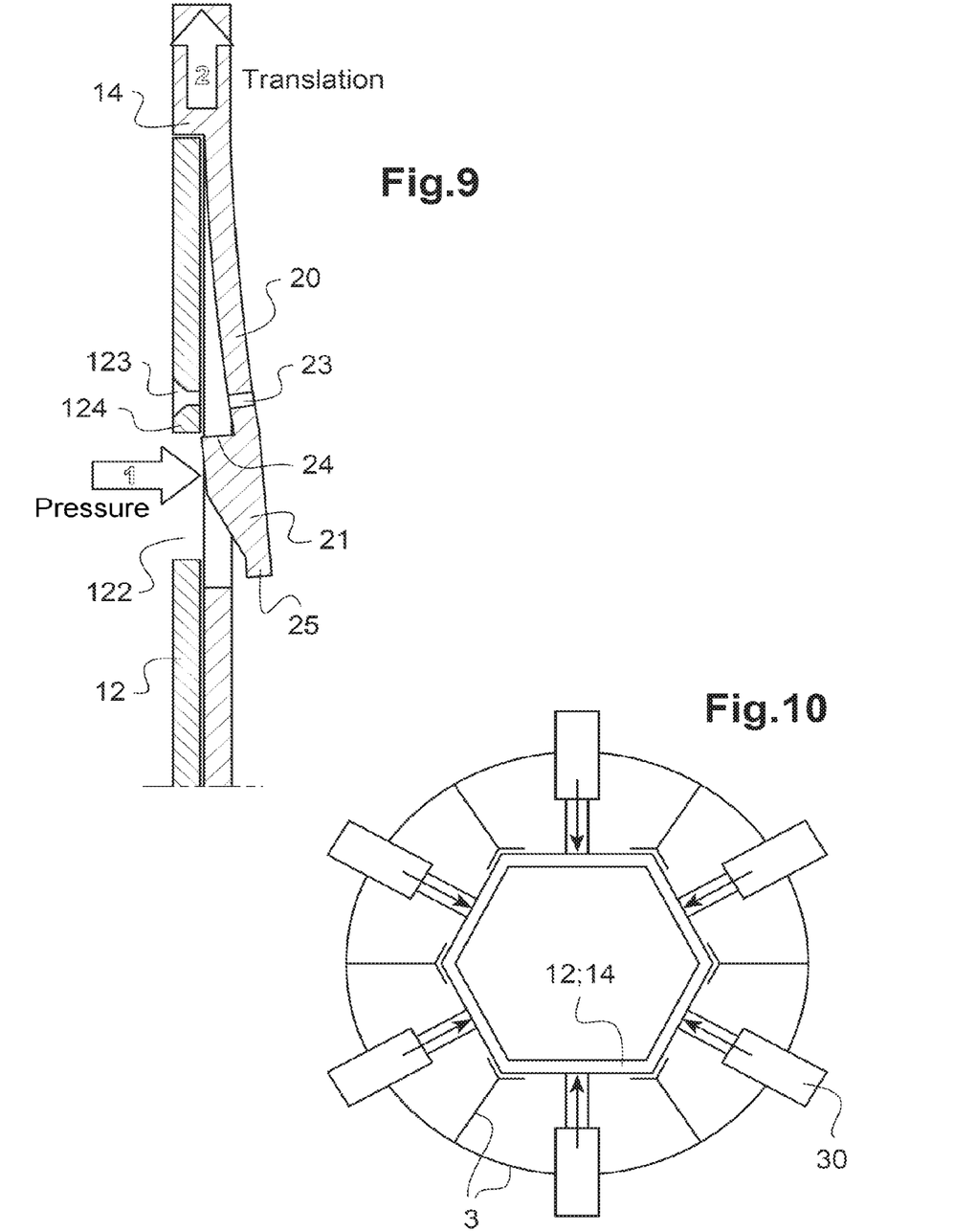
FIGS. 9 and 10 illustrate the method of uninserting an element assembled in a hollow component according to the invention.

One way of uninserting two elements assembled according to the invention is given in FIGS. 9 and 10. In this example, a collar 3 supporting actuators 30 is inserted around the hollow component 12. The number of actuators 30 is equal to the number of flexible blades 20, 21. Each actuator is positioned facing a thickening 21 of a blade 20.

When the assembly is to be dismantled, the actuators 30 are actuated simultaneously and thus apply radial pressure to the thickened portion 21 of each blade, so that the element 14 is no longer connected to the hollow component 12 and can be extracted through an upward translational movement.

Other alternative forms and improvements may be made without in any way departing from the scope of the invention.

Thus, while in the embodiments illustrated the flexible blades are locked by a locking screw, it is also possible to envision preventing a flexible blade from flexing by using an internal elastic ring housed in a groove provided for this purpose in the flexible blade on the inside.

The invention is not restricted to the examples which have just been described. In particular, features of the examples illustrated can notably be combined with one another in alternative forms of embodiment which are not illustrated.

The expression "comprising a" is to be understood as meaning "comprising at least one", unless specified to the contrary.

The invention claimed is:

1. An assembly intended to be inserted into a nuclear reactor, comprising:
   an assembly hollow body, of elongate shape along a longitudinal axis X, a wall of the hollow body comprising at least one through-opening that extends through the wall;
   an assembly element inserted at least in part into the hollow body, the assembly element comprising at least one flexible blade of which a free end is shaped into a clip-fastening hook collaborating in clip-fastening with the through-opening from inside the hollow body, so as to connect the assembly element to the hollow body; and
   at least one removable means for locking the at least one flexible blade clip-fastened into the through-opening, each of the at least one removable means for locking including a locking screw making it possible to prevent the at least one flexible blade from flexing and thus lock the connection between the assembly element and the hollow body.

2. The assembly according to claim 1, wherein the clip-fastening hook is produced by a thickening of the free end of the at least one flexible blade.

3. The assembly according to claim 1, wherein the hollow body is of hexagonal cross section and each face of the hexagon comprises one through-opening, and the at least one flexible-blade includes a flexible blade clip-fastened into each of the through-openings.

4. The assembly according to claim 1, wherein the locking screw of each of the at least one removable means for locking, when in a position in which the locking screw is screwed into the at least one flexible blade, makes it possible to prevent the at least one flexible blade from flexing and from becoming unclipped.

5. The assembly according to claim 1, wherein each of the at least one flexible blade is produced by cutting into a thickness of the assembly element.

6. The assembly according to claim 5, wherein the wall of the assembly hollow body comprises at least one open-ended bore designed to allow the locking screw to pass from the outside of the hollow body and a screw head to be housed.

7. The assembly according to claim 1, wherein each of the at least one flexible blade is attached and fixed to the assembly element by a fixing screw.

8. The assembly according to claim 7, wherein each fixing screw is welded to the assembly element and/or to the at least one flexible blade in its screwed-in position.

9. The assembly according to claim 8, wherein the assembly element comprises at least one cavity in which the clip-fastening hook can become lodged when the at least one flexible blade is in the flexed position, the locking screw being screwed through the clip-fastening hook and housed in the cavity when the at least one flexible blade is clipped in, so as to prevent the at least one flexible blade from flexing.

10. The assembly according to claim 1, wherein the assembly is a nuclear fuel assembly, the hollow body being a central portion forming a casing configured to clad fuel pins, the assembly element being an upper neutron shield (UNS) device or the assembly element forming an upper portion forming a gripper head of the assembly.

11. The assembly according to claim 1, wherein the nuclear reactor is a liquid sodium-cooled fast neutron reactor.

12. The assembly according to claim 1, wherein the assembly element includes a shoulder and, when the assembly element is inserted into the assembly hollow body, a top of the assembly hollow body abuts the shoulder of the assembly element.

13. A method for assembling the assembly according to claim 1, wherein the assembly comprises at least two of the flexible blades, the method comprising:
   a/ inserting the assembly element into the assembly hollow body by a translational movement, so as to achieve simultaneous flexing of the at least two flexible blades toward the inside of the hollow body, lowering of the assembly element down inside the hollow body until the at least two flexible blades return to their position with their hooks clip-fastened into the corresponding through-openings of the hollow body so as to connect the hollow body to the assembly element; and
   b/ locking each of the at least two flexible blades clip-fastened into the through-opening using the at least one removable means for locking.

14. A method for dismantling the assembly according to claim 1, wherein the assembly comprises at least two of the flexible blades, the method comprising:
   a1/ unlocking each of the at least two flexible blades, the hook of each of which is clip-fastened into the corresponding through-opening, by removing the at least one removable means for locking;
   b1/ applying a radial force to the hook of each of the at least two flexible blades from the outside of the through-opening, so as to cause the at least two flexible blades to flex simultaneously toward the inside of the hollow body, unclipping the hooks; and
   c1/ extracting the assembly element from inside the assembly hollow body via a translational movement.

15. The dismantling method according to claim 14,
wherein the assembly element comprises a plurality of the
   flexible blades and the hook of each of the flexible
   blades
   is individually clip-fastened into the corresponding
      through-opening of the hollow body
   and locked,
step b1/ being performed by simultaneous actuation of
   actuators, and arranged individually facing one of the
   through-openings.

* * * * *